(12) United States Patent
Di Mauro

(10) Patent No.: US 10,803,729 B1
(45) Date of Patent: Oct. 13, 2020

(54) SYSTEM AND METHOD FOR SENDING AUTOMATIC NOTIFICATIONS

(71) Applicant: Stephen Anthony Di Mauro, Gainesville, VA (US)

(72) Inventor: Stephen Anthony Di Mauro, Gainesville, VA (US)

( * ) Notice: Subject to any disclaimer, the term of this patent is extended or adjusted under 35 U.S.C. 154(b) by 0 days.

(21) Appl. No.: 16/674,219

(22) Filed: Nov. 5, 2019

Related U.S. Application Data

(60) Provisional application No. 62/755,780, filed on Nov. 5, 2018.

(51) Int. Cl.
| | | |
|---|---|---|
| *G08B 23/00* | (2006.01) | |
| *G08B 21/22* | (2006.01) | |
| *H04W 4/021* | (2018.01) | |
| *G06K 9/00* | (2006.01) | |
| *G08B 25/01* | (2006.01) | |
| *G08B 25/00* | (2006.01) | |

(52) U.S. Cl.
CPC ......... *G08B 21/22* (2013.01); *G06K 9/00838* (2013.01); *G08B 25/006* (2013.01); *G08B 25/016* (2013.01); *H04W 4/021* (2013.01)

(58) Field of Classification Search
CPC .... G08B 21/22; G08B 25/006; G08B 25/016; G06K 9/00838; H04W 4/021
See application file for complete search history.

(56) References Cited

U.S. PATENT DOCUMENTS

| | | | | |
|---|---|---|---|---|
| 9,030,313 | B1* | 5/2015 | Pearson | B60N 2/26 180/273 |
| 9,937,830 | B1* | 4/2018 | Curry, V | B60N 2/879 |
| 9,969,344 | B1* | 5/2018 | Kolasi ski | B60R 21/01516 |
| 2006/0044126 | A1* | 3/2006 | Ho | G08B 21/22 340/457 |
| 2017/0054949 | A1* | 2/2017 | Shaw | G02B 27/0101 |

* cited by examiner

*Primary Examiner* — Phung Nguyen
(74) *Attorney, Agent, or Firm* — Polsinelli PC

(57) ABSTRACT

A system includes a memory and at least one processor to perform one of (1) determine that a vehicle is within a geofence, receive a checkout notification in response to the user selecting a checkout user interface element displayed on a display, and disable the emergency countdown timer, (2) determine that the vehicle is within the geofence, display the checkout user interface on the display, fail to receive the checkout notification, and after the particular period of time, send the at least one of the text message and the automated call to the emergency responder requesting assistance for a person in a seat of the vehicle, and (3) determine that the vehicle is outside of the geofence and after the particular period of time, send at least one of a text message and an automated call to an emergency responder requesting assistance for the person in the seat of the vehicle.

20 Claims, 7 Drawing Sheets

SYSTEM AND METHOD FOR SENDING AUTOMATIC NOTIFICATIONS

CROSS REFERENCE TO RELATED APPLICATION

This application claims the benefit of priority to U.S. Appl. No. 62/755,780 filed Nov. 5, 2018, entitled "System and Method for Sending Automatic Notifications," the entire contents of which is hereby incorporated herein by reference.

BACKGROUND

Computing devices have gradually become ubiquitous and a part of daily life. Users of smartphones and tablets have access to a portable device that is capable of communicating with others, capable of executing applications, and capable of sending information to other devices and receiving information from other devices.

Unfortunately, since the federal government began tracking in 1998, there has been an average of thirty-nine children killed in unattended hot vehicles in the United States per year. In 2017, forty-one children were killed. It has become all too common for a parent to become distracted and forget that their child remains in a parked vehicle. Recently, a one-year old child died when a parent forgot to drop the child off at daycare before heading out of town on a business trip. The parent parked the vehicle in their driveway with the child still in the vehicle and used a ride share service to depart for the trip. This sort of situation, where a parent or guardian forgets a child because of a lapse in memory or disrupted routine is sadly common.

A very high percentage of vehicular heatstroke victims are under the age of three and more than half are under the age of one. Many younger children are placed in car seats and safety seats that may be rear-facing. As a result, these children may be out of the view of the driver of the vehicle and many cannot yet talk. A child is also more susceptible to the rising heat in vehicles because their body temperature increases three to five times faster than adults. It is known that the temperature inside of a vehicle can increase twenty degrees in ten minutes and that vehicular heatstroke can occur even if the outdoor temperature is not hot. Some states have started to enact and propose laws that are designed to help prevent vehicular heatstroke, but most deaths are accidental and not easily prevented using laws.

It is with these issues in mind, among others, that various aspects of the disclosure were conceived.

SUMMARY

According to one aspect, a system for sending automatic notifications includes a sensor device that is placed in a vehicle and in communication with a client computing device. The sensor device may be connected to a safety seat for a child. The sensor device may be battery powered and determine the presence of a child in the safety seat and may determine at least one of a temperature in the vehicle, humidity in the vehicle, barometric pressure in the vehicle, sound in the vehicle, vibration in the vehicle, and a location of the vehicle. An emergency countdown timer may begin if at least one of the following occurs: the client computing device is greater than a particular distance from the vehicle, the temperature in the vehicle is higher than a first particular temperature or lower than a second particular temperature, the humidity in the vehicle is higher than a particular level, the sound in the vehicle is determined to be greater than a particular decibel level, and the vibration in the vehicle is greater than a particular vibration level. If the client computing device is located within the particular distance from the vehicle while the timer is activated, then the user of the client computing device may stop the timer and deactivate the system. However, when the timer expires, the client computing device may automatically send at least one of a text message and a call to an emergency responder. The text message and the call may include information associated with a make/model of the vehicle, a color of the vehicle, a name of the child, an age of the child, and a location of the vehicle, among other information.

According to an aspect, a system includes a memory and at least one processor to receive a checkin notification in response to a user selecting a checkin user interface element displayed on a display, in response to the checkin notification, request a weight of a person in a seat of a vehicle from a weight sensor of a sensor device located in the vehicle and determine that the weight of the person is correct, receive a notification from the sensor device located in the vehicle, the notification comprising at least one of a distance notification, a temperature notification, a sound notification, and a vibration notification, in response to the notification from the sensor device, begin an emergency notification countdown timer having a particular period of time, and perform one of (1) determine that the vehicle is within a geofence, receive a checkout notification in response to the user selecting a checkout user interface element displayed on the display, and disable the emergency countdown timer, (2) determine that the vehicle is within the geofence, display the checkout user interface on the display, fail to receive the checkout notification, and after the particular period of time, send the at least one of the text message and the automated call to the emergency responder requesting assistance for the person in the seat of the vehicle, and (3) determine that the vehicle is outside of the geofence and after the particular period of time, send at least one of a text message and an automated call to an emergency responder requesting assistance for the person in the seat of the vehicle.

According to another aspect, a method includes receiving, by at least one processor, a checkin notification in response to a user selecting a checkin user interface element displayed on a display, in response to the checkin notification, requesting, by the at least one processor, a weight of a person in a seat of a vehicle from a weight sensor of a sensor device located in the vehicle and determining that the weight of the person is correct, receiving, by the at least one processor, a notification from the sensor device located in the vehicle, the notification comprising at least one of a distance notification, a temperature notification, a sound notification, and a vibration notification, in response to the notification from the sensor device, beginning, by the at least one processor, an emergency notification countdown timer having a particular period of time, and performing, by the at least one processor, one of (1) determining that the vehicle is within a geofence, receiving a checkout notification in response to the user selecting a checkout user interface element displayed on the display, and disabling the emergency countdown timer, (2) determining that the vehicle is within the geofence, displaying the checkout user interface on the display, failing to receive the checkout notification, and after the particular period of time, sending the at least one of the text message and the automated call to the emergency responder requesting assistance for the person in the seat of the vehicle, and (3) determining that the vehicle is outside of the geofence and after the particular period of time, sending at least one of a text message and an automated call to an emergency responder requesting assistance for the person in the seat of the vehicle.

According to an additional aspect, a non-transitory computer-readable storage medium includes instructions stored thereon that, when executed by a computing device cause the computing device to perform operations, the operations including receiving a checkin notification in response to a user selecting a checkin user interface element displayed on a display, in response to the checkin notification, requesting a weight of a person in a seat of a vehicle from a weight sensor of a sensor device located in the vehicle and determining that the weight of the person is correct, receiving a notification from the sensor device located in the vehicle, the notification comprising at least one of a distance notification, a temperature notification, a sound notification, and a vibration notification, in response to the notification from the sensor device, beginning an emergency notification countdown timer having a particular period of time, and performing one of (1) determining that the vehicle is within a geofence, receiving a checkout notification in response to the user selecting a checkout user interface element displayed on the display, and disabling the emergency countdown timer, (2) determining that the vehicle is within the geofence, displaying the checkout user interface on the display, failing to receive the checkout notification, and after the particular period of time, sending the at least one of the text message and the automated call to the emergency responder requesting assistance for the person in the seat of the vehicle, and (3) determining that the vehicle is outside of the geofence and after the particular period of time, sending at least one of a text message and an automated call to an emergency responder requesting assistance for the person in the seat of the vehicle.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
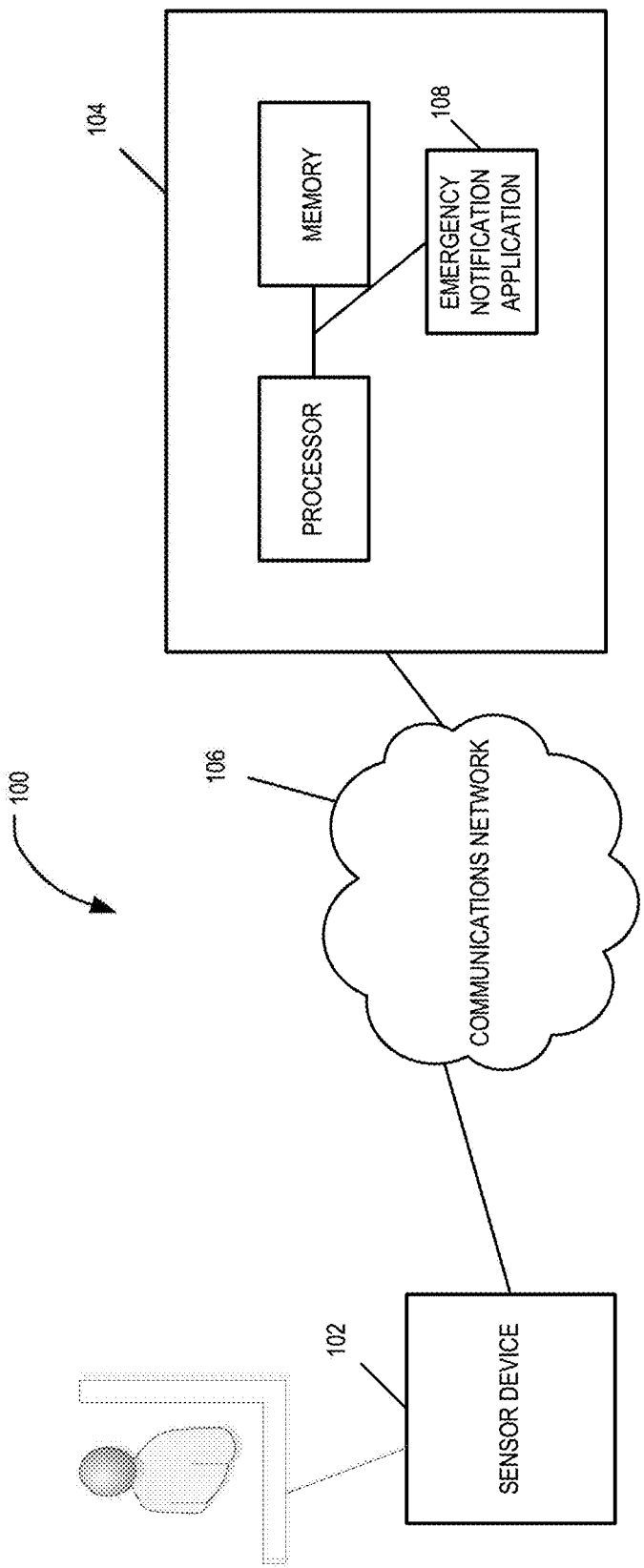
FIG. 1 is a block diagram of a system for sending automatic notifications according to an example embodiment.

Aspects of a system and method for sending automatic notifications includes a sensor device that is placed in a vehicle and in communication with a client computing device. The sensor device may be connected to a safety seat for a child. The sensor device may be battery powered and determine the presence of a child in the safety seat and may determine at least one of a temperature in the vehicle, humidity in the vehicle, barometric pressure in the vehicle, sound in the vehicle, vibration in the vehicle, and a location of the vehicle.

As an example, if the sensor device is triggered by the temperature in the vehicle, a timer may begin. The timer may be five minutes. As a further example, the sensor device may be triggered if at least one of the following occurs: the vehicle is outside of a geofence associated with the client computing device (e.g., further than a particular distance from the client computing device), the temperature in the vehicle is higher than a first particular temperature or lower than a second particular temperature, the sound in the vehicle is determined to be greater than a particular decibel level, or the vibration in the vehicle is greater than a particular vibration level. If the vehicle is within the geofence while the timer is activated, then the user of the client computing device may stop the timer and deactivate the system. However, when the timer expires, the client computing device may automatically send at least one of a text message and place a call to an emergency responder. The text message and the call may include information associated with a make/model of the vehicle, a color of the vehicle, a name of the child, an age of the child, and a location of the vehicle, among other information.

The system may ensure that children and/or animals are not left in unattended vehicles. In many instances, the unattended vehicle may become very hot or very cold in a limited amount of time. This could lead to severe injury or death. The system discussed herein provides a virtual safety barrier around the child or animal and may alert at least one contact including emergency responders such as police, fire, and rescue when it is determined that at least one of the following occurs: (1) a vehicle is outside of a geofence associated with an associated computing device, (2) the temperature in the vehicle is higher than a first particular temperature (e.g., ninety degrees) or lower than a second particular temperature (e.g., thirty degrees), (3) the sound in the vehicle is determined to be greater than a particular decibel level (e.g., twenty-five decibels), and (4) the vibration in the vehicle is greater than a particular vibration level. As an example, the geofence may be a perimeter that may be dynamically generated based on the location of the client computing device. The geofence may be a circle or have a circular shape having a center based on the current location of the client computing device and the circle may have a radius of fifty feet that extends outward from the current location of the client computing device. The sensor device and the client computing device may continually determine whether the vehicle is within the geofence. In another embodiment, the geofence may be dynamically generated based on the location of the vehicle. In another embodiment, the geofence may be dynamically generated based on the location of the vehicle and the location of the client computing device.

The system may include a memory and at least one processor to receive a checkin notification in response to a user selecting a checkin user interface element displayed on a display, in response to the checkin notification, request a weight of a person in a seat of a vehicle from a weight sensor of a sensor device located in the vehicle and determine that the weight of the person is correct, receive a notification from the sensor device located in the vehicle, the notification comprising at least one of a distance notification, a temperature notification, a sound notification, and a vibration notification, in response to the notification from the sensor device, begin an emergency notification countdown timer having a particular period of time, and perform one of (1) determine that the vehicle is within a geofence, receive a checkout notification in response to the user selecting a checkout user interface element displayed on the display, and disable the emergency countdown timer, (2) determine that the vehicle is within the geofence, display the checkout user interface on the display, fail to receive the checkout notification, and after the particular period of time, send the at least one of the text message and the automated call to the emergency responder requesting assistance for the person in the seat of the vehicle, and (3) determine that the vehicle is outside of the geofence and after the particular period of time, send at least one of a text message and an automated call to an emergency responder requesting assistance for the person in the seat of the vehicle.

FIG. 1 shows a block diagram of a computing system comprising an automatic notification system 100 according to an example embodiment. The automatic notification system 100 includes at least one sensor device 102 that is physically located in a vehicle and in communication with at least one client computing device 104 via a communication network 106. The sensor device 102 may be battery powered and/or powered by the vehicle, and connected to and/or associated with a seat in a vehicle. The battery may be a CR2477 battery or another type of battery. The seat may be a safety seat for a child or a person, or may hold another object such as a crate for an animal. Alternatively, the sensor device 102 may be located in the vehicle and not associated with the seat. As an example, the sensor device 102 may be embedded in a collar for an animal.

In one example, the sensor device 102 may be a smart sensor such as a device made by SensorPush such as HT1 Temperature and Humidity Smart Sensor that may include a thermometer/hygrometer to monitor humidity and temperature conditions. The sensor device 102 may also include a gateway device to connect the smart sensor to the communication network 106.

In another example, the sensor device 102 may include one or more sensors such as a weight sensor to determine a weight of the child in the safety seat, a location sensor (e.g., a global positioning device (GPS) to determine a current location of the vehicle), a temperature sensor to determine a current temperature in the vehicle, a sound sensor to determine a current decibel level in the vehicle, a vibration sensor (e.g., an accelerometer) to determine a current vibration level in the vehicle, a humidity sensor (e.g., a hygrometer) to determine a current humidity in the vehicle, and a barometric pressure sensor to determine a current barometric pressure in the vehicle, among other sensors.

The at least one sensor device 102 is configured to receive data from and/or transmit data to the at least one client computing device 104 through the communication network 106. Although the at least one sensor device 102 is shown as a single sensor, it is contemplated that the at least one sensor device 102 may include multiple sensors.

The communication network 106 can be the Internet, an intranet, or another wired or wireless communication network. For example, the communication network 106 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one sensor device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the emergency notification application 108. In addition, the at least one sensor device 102 further includes at least one communications interface to transmit and receive communications, messages, and/or signals.

The at least one client computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the emergency notification application 108. In addition, the at least one client computing device 104 further includes at least one communications interface to transmit and receive communications, messages, and/or signals.

The at least one client computing device 104 can be a laptop computer, a smartphone, a personal digital assistant, a tablet computer, a standard personal computer, or another processing device. The at least one client computing device 104 may include a display, such as a computer monitor, for displaying data and/or graphical user interfaces. The at least one client computing device 104 may also include a Global Positioning System (GPS) hardware device for determining a particular location of the client computing device 104, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one client computing device 104 may display on the display a graphical user interface (or GUI) to generate a graphical user interface on the display. The graphical user interface may be provided by the emergency notification application 108. The graphical user interface enables a user of the at least one client computing device 104 to interact with the emergency notification application 108.

The emergency notification application 108 may be a component of an application and/or service executable by the at least one client computing device 104. For example, the emergency notification application 108 may be a single unit of deployable executable code or a plurality of units of deployable executable code. According to one aspect, the emergency notification application 108 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

Figure 2:
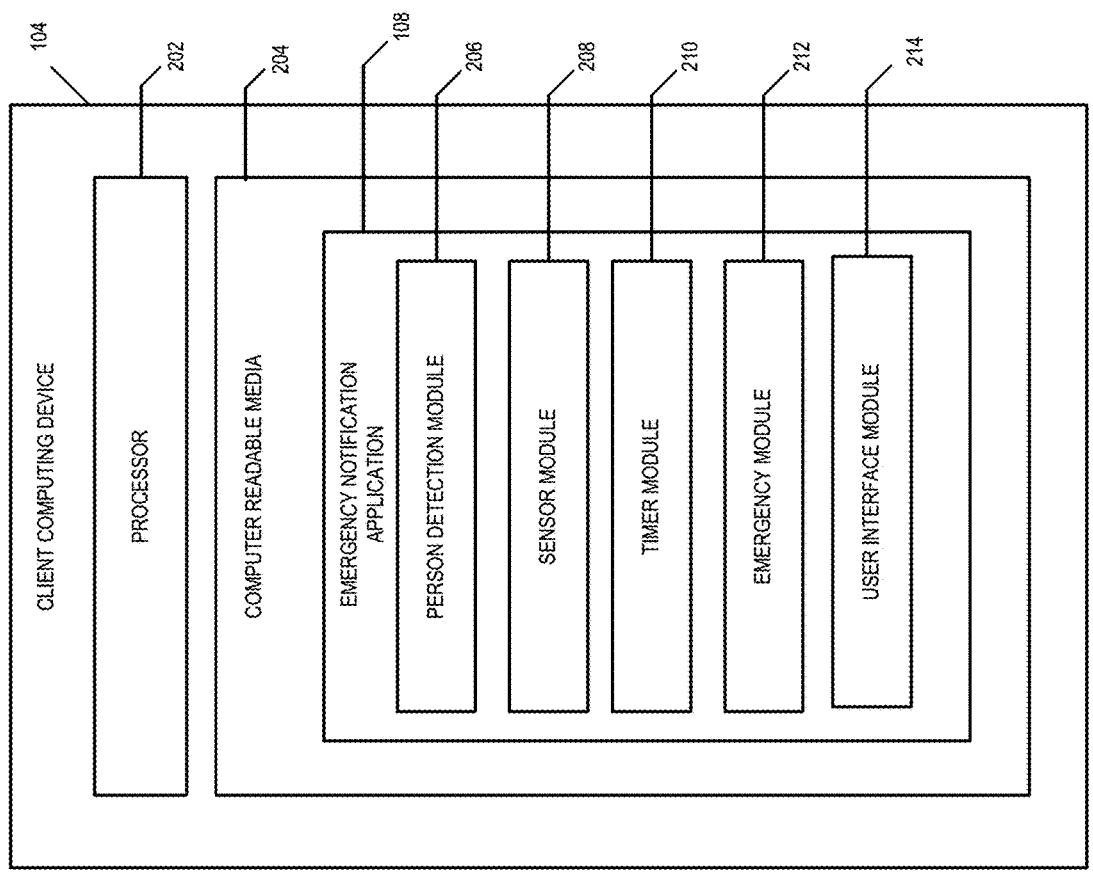
FIG. 2 shows a block diagram of a client computing device of the system according to an example embodiment.

FIG. 2 illustrates a block diagram of the client computing device 104 according to an example embodiment. The client computing device 104 includes at least one processor 202 and computer readable media (CRM) 204 in memory on which the emergency notification application 108 or other user interface or application is stored. The computer readable media may include volatile media, nonvolatile media, removable media, non-removable media, and/or another available medium that can be accessed by the processor. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The emergency notification application 108 may include a person detection module 206 for detecting the presence of a child, a person, or another object such as an animal in the vehicle. As an example, the person detection module 206 may be activated in response to a user selecting a checkin and activate user interface element (e.g., a button) that may be displayed by the emergency notification application 108. At this point, the emergency notification application 108 may request that a weight sensor of the sensor device 102 determine a weight of the child located in the safety seat and compare the weight with a stored, known weight of the child. Alternatively, the sensor device may transmit the determined weight to the emergency notification application 108 and the determined weight may be compared with a weight stored by the emergency notification application. If the determined weight matches or is within a particular weight of the stored, known weight, then the automatic notification system 100 is activated.

The emergency notification application 108 may include a sensor module 208 that communicates with each sensor of the sensor device 102 and receives information and notifications from the sensor device 102. As an example, the sensor module 208 may receive notifications from the weight sensor, the location sensor, the temperature sensor, the sound sensor, the vibration sensor, the humidity sensor, and the barometric sensor, among other sensors. As an example, the sensor module 208 may continually generate a geofence having a shape of a circle having a center based on the current location of the client computing device 104. The sensor module 208 may continually determine whether each of the vehicle and the sensor device 102 is within or outside of the geofence. In addition, the sensor module 208 may determine a current temperature inside the vehicle as determined by the temperature sensor and may determine whether the current temperature is over a particular temperature or under a particular temperature. In another example, the sensor module 208 may determine whether a current heat index that combines air temperature and relative humidity is over a particular heat index. In addition, the sensor module 208 may determine that the level of sound inside the vehicle is over a particular decibel level as determined by the sound sensor. This may happen if a child is yelling or asking for help inside the vehicle. The sensor module 208 may determine that a level of vibration is over a particular level in the vehicle as determined by the vibration sensor. This may happen if the child is strapped in the safety seat and attempting to get out of the safety seat.

The emergency notification application 108 may include a timer module 210. The timer module 210 may begin an emergency notification countdown timer in response to a notification from the sensor device 102 as provided to the sensor module 208. The emergency notification countdown timer may have a particular period of time, e.g., five minutes.

The emergency notification application 108 may include an emergency module 212 for sending at least one of a text message and an automated call to an emergency responder requesting assistance for the person in the seat of the vehicle. The text message and/or the automated call may be sent after the particular period of time if the vehicle is outside of the geofence or if the vehicle is within the geofence and the emergency notification application 108 does not receive a checkout and deactivate request from the user. The geofence may be determined by the sensor device 102 and/or the client computing device 104. As an example, the geofence may be a circle that extends outward from the location of the client computing device 104. The geofence may have a radius of fifty feet that extends outward from the client computing device 104. If the vehicle is outside of the fifty-foot geofence, then the client computing device 104 may not be provided with the opportunity to checkout and deactivate the emergency notification countdown timer. At the end of the timer, this may trigger the emergency module 212 to send at least one of the text message and the automated call.

Alternatively, the emergency notification application 108 may determine that the vehicle is within the geofence and may display a user interface element that allows the user to checkout the child and deactivate the automatic notification system 100. The emergency notification application 108 may display a user interface that allows the user to deactivate the automatic notification system 100. The user may arrive at a destination and deactivate the automatic notification system 100 and remove the child from the safety seat. However, if the vehicle is within the geofence and the user does not checkout and deactivate the automatic notification system 100 before the end of particular period of time, then the emergency module 212 may send at least one of the text message and the automated call.

Alternatively, the emergency module 212 may send a message including a text message or another type of notification to at least one other contact associated with the user of the emergency notification application 108 or the child. In one example, the at least one other contact may be a parent of the child or a guardian of the child. The notification may be a push notification that may be displayed on another client computing device associated with the at least one other contact.

In addition, the emergency notification application 108 includes a user interface module 214 for displaying the user interface on the display. As an example, the user interface module 214 generates a native and/or web-based graphical user interface (GUI) that accepts input and provides output viewed by users of the client computing device 104. The client computing device 104 may provide realtime automatically and dynamically refreshed emergency notification information. The user interface module 214 may send data to other modules of the emergency notification application 108 of the client computing device 104, and retrieve data from other modules of the emergency notification application 108 of the client computing device 104 asynchronously without interfering with the display and behavior of the user interface displayed by the client computing device 104.

Figure 3:
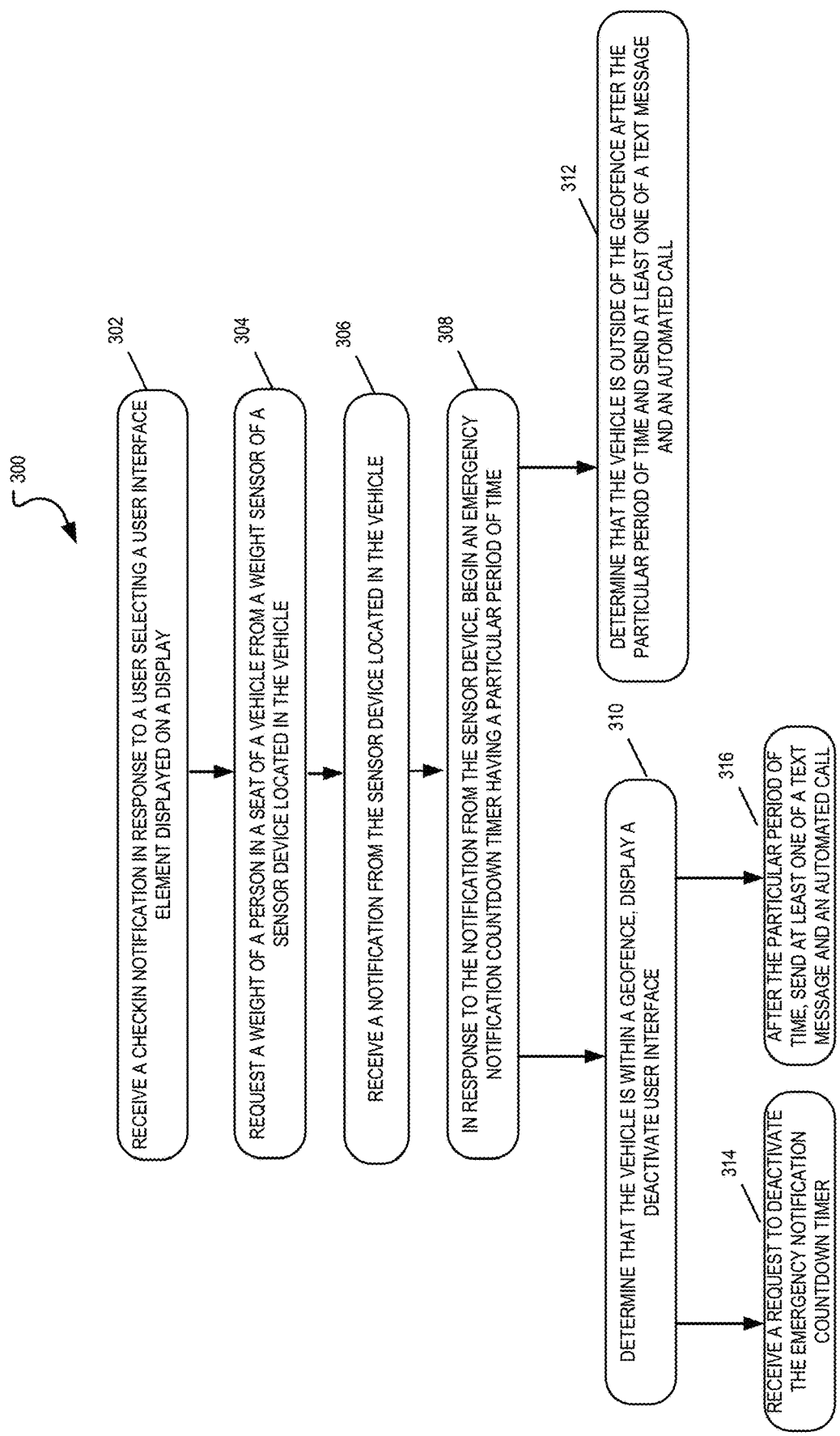
FIG. 3 illustrates a flowchart for sending an automatic notification according to an example embodiment.

FIG. 3 illustrates a flowchart of a process 300 for sending an automatic notification, according to an example embodiment. In step 302, a user of the client computing device 104 provides a checkin notification to a user interface element displayed by the emergency notification application 108. The user may have just placed their child into a safety seat located in a vehicle. In step 304, in response to the checkin notification, the emergency notification application 108 may request a weight of a person located in the safety seat from a weight sensor of the sensor device 102 that is located in the vehicle. The sensor device 102 and/or the client computing device 104 may determine that the weight is correct by comparing the weight from the weight sensor with a weight stored by the emergency notification application 108. At this point, the automatic notification system 100 is activated.

As an example, the user of the emergency notification application 108 may stop the vehicle at a location such as their home while the child is located in the safety seat. The user may enter their home and leave the vehicle parked in the driveway. Alternatively, the user may enter a store and leave the vehicle parked in a parking lot. At this point, in step 306, the client computing device 104 may receive a notification from the sensor device located in the vehicle. The notification may be one of a distance notification, a temperature notification, a sound notification, and a vibration notification. The sensor device 102 may determine at least one of the vehicle is outside of the geofence and trigger the distance notification, determine by a temperature sensor of the sensor device that a temperature is greater than a first temperature (e.g., ninety degrees) and trigger the temperature notification, determine by the temperature sensor of the sensor device that the temperature is less than a second temperature (e.g., thirty degrees) and trigger the temperature notification, determine by a sound sensor of the sensor device that a decibel level is greater than a particular level (e.g., twenty-five decibels) and trigger the sound notification, and determine by a vibration sensor of the sensor device that the vibration level is greater than a particular level and trigger the vibration notification.

Next, in step 308, in response to the notification from the sensor device 102, the sensor device 102 and/or the emergency notification application 108 may begin an emergency notification countdown timer having a particular period of time. The particular period of time may be five minutes or another period of time.

In step 310, the emergency notification application 108 may determine that the vehicle is within the geofence and may display a user interface that allows the user to deactivate the automatic notification system 100. The client computing device 104 may receive a notification based on one of the distance notification, the temperature notification, the sound notification, and the vibration notification. In one example, the notification may be a push notification. In step 314, the user may select a user interface element to deactivate the automatic notification system 100 and the emergency notification countdown timer may stop.

However, in step 316, if the user does not deactivate the automatic notification system 100 during the particular period of time, the emergency notification application 108 will proceed with the emergency notification application 108 sending at least one of a text message and an automated call to an emergency responder requesting assistance for the child in the seat of the vehicle.

Alternatively, in step 312, the emergency notification application 108 may determine that the vehicle is outside of the geofence. The client computing device 104 may receive a notification based on one of the distance notification, the temperature notification, the sound notification, and the vibration notification. In one example, the notification may be a push notification. However, because the vehicle is outside of the geofence, the client computing device 104 may not display the user interface that allows the user to deactivate the automatic notification system 100.

After the particular period of time, the emergency notification application 108 may send at least one of a text message and an automated call to an emergency responder requesting assistance for the child in the seat of the vehicle. In one embodiment, the emergency notification application 108 may request and/or review updated information from the sensor device 102 before sending the at least one of the text message and the automated call. As an example, during the timer the temperature in the vehicle may have decreased to a temperature where it is no longer dangerous and less than the first temperature. In some instances, where the sensor measures do not indicate an emergency situation due to temperature, vibration, sound, etc., the emergency notification application 108 may not send the at least one of the text message and the automated call and may reinitiate the timer.

The at least one of the text message and the automated call may include information associated with a make/model of the vehicle, a color of the vehicle, a name of the child, an age of the child, and a location of the vehicle, e.g., a latitude of the vehicle and a longitude of the vehicle. In one embodiment, the emergency responder may be at least one of police, fire, and emergency medical services. In addition, the text message and/or the automated call may be sent to the at least one other contact such as another person associated with the child in the seat such as a parent or a guardian of the child.

Figure 4:
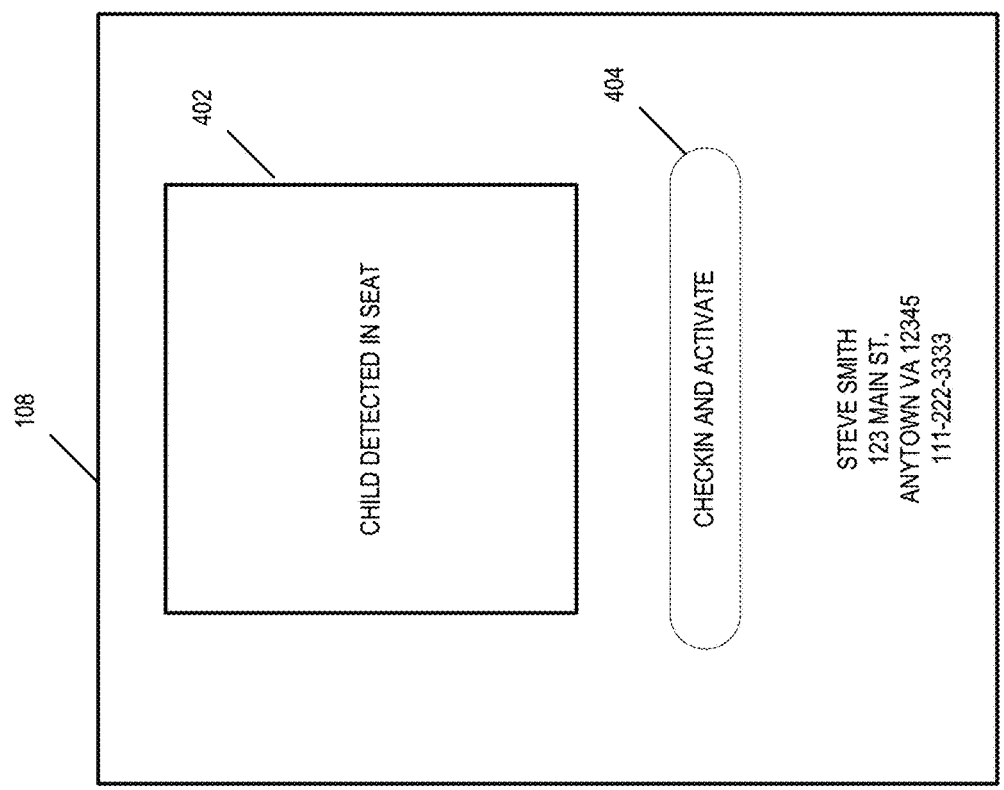
FIG. 4 illustrates an example user interface of an application executed by the client computing device according to an example embodiment.

FIG. 4 shows an example user interface of the emergency notification application 108 displayed by the client computing device 104 according to an example embodiment. As shown in FIG. 4, the child has been placed in a safety seat in a vehicle and the weight sensor of the sensor device 102 has detected the child in the seat. The weight sensor of the sensor device 102 may have compared the determined weight with a known, stored weight and determined that it is within a particular weight of the known, stored weight. In another example, the weight sensor may transmit the determined weight to the client computing device 104 and the emergency notification application 108 may compare the determined weight to the known, stored weight. As a result, the user interface element 402 displays "Child detected in seat." FIG. 4 also shows a checkin and activate user interface element 404 that allows the user to activate the automatic notification system 100. When the checkin and activate user interface element 404 is selected, the automatic notification system 100 is activated.

Figure 5:
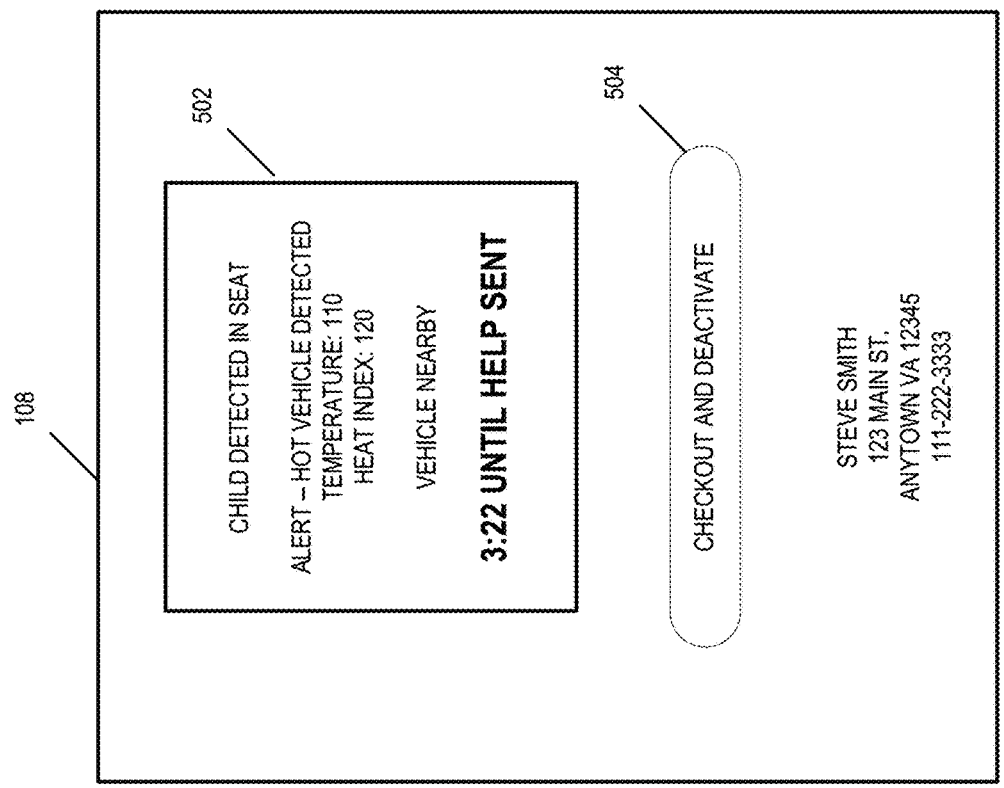
FIG. 5 illustrates an example user interface of the application executed by the client computing device according to an example embodiment.

FIG. 5 shows another example user interface of the emergency notification application 108 displayed by the client computing device 104 according to an example embodiment. As shown in FIG. 5, the automatic notification system 100 is activated. The child has been detected as being in the seat and there is a notification provided by the temperature sensor of the sensor device 102. The temperature in the vehicle is 110 degrees, which is over a particular threshold temperature. Alternatively, the heat index in the vehicle may be 120 degrees, which is over a particular threshold heat index. Thus, in response to the notification from the sensor device 102, the emergency notification countdown timer has begun. As shown in FIG. 5, there are three minutes and twenty two seconds left on the emergency notification countdown timer.

However, as shown in FIG. 5, the vehicle is located within the geofence and thus the user has the option to select the checkout and deactivate user interface element 504 that when selected deactivates the automatic notification system 100. If the vehicle was not located within the geofence, then the user may not have the option to select the checkout and deactivate user interface element 504. It may not be displayed or alternatively, the checkout and deactivate user interface element 504 may be displayed and not be selectable. In one example, it may be greyed out or disabled. In another example, the example user interface of the emergency notification application 108 may display a user interface element that displays information associated with the location of the vehicle. As an example, the emergency notification application 108 may display a distance to the vehicle and directional information such as an arrow. In another example, the emergency notification application 108 may display a map of the vehicle and/or a street view of the current location of the vehicle. Other display options are possible. In a further example, the client computing device 104 may emit a sound and/or an alarm during the emergency notification countdown timer. In an even further example, the sensor device 102 may emit a sound and/or an alarm during the emergency notification countdown timer.

If the vehicle is outside of the geofence or the user does not deactivate the automatic notification system 100 during the particular period of time, then after the particular period of time, the emergency notification application 108 may automatically send at least one of a text message and a call to at least one emergency responder.

Figure 6:
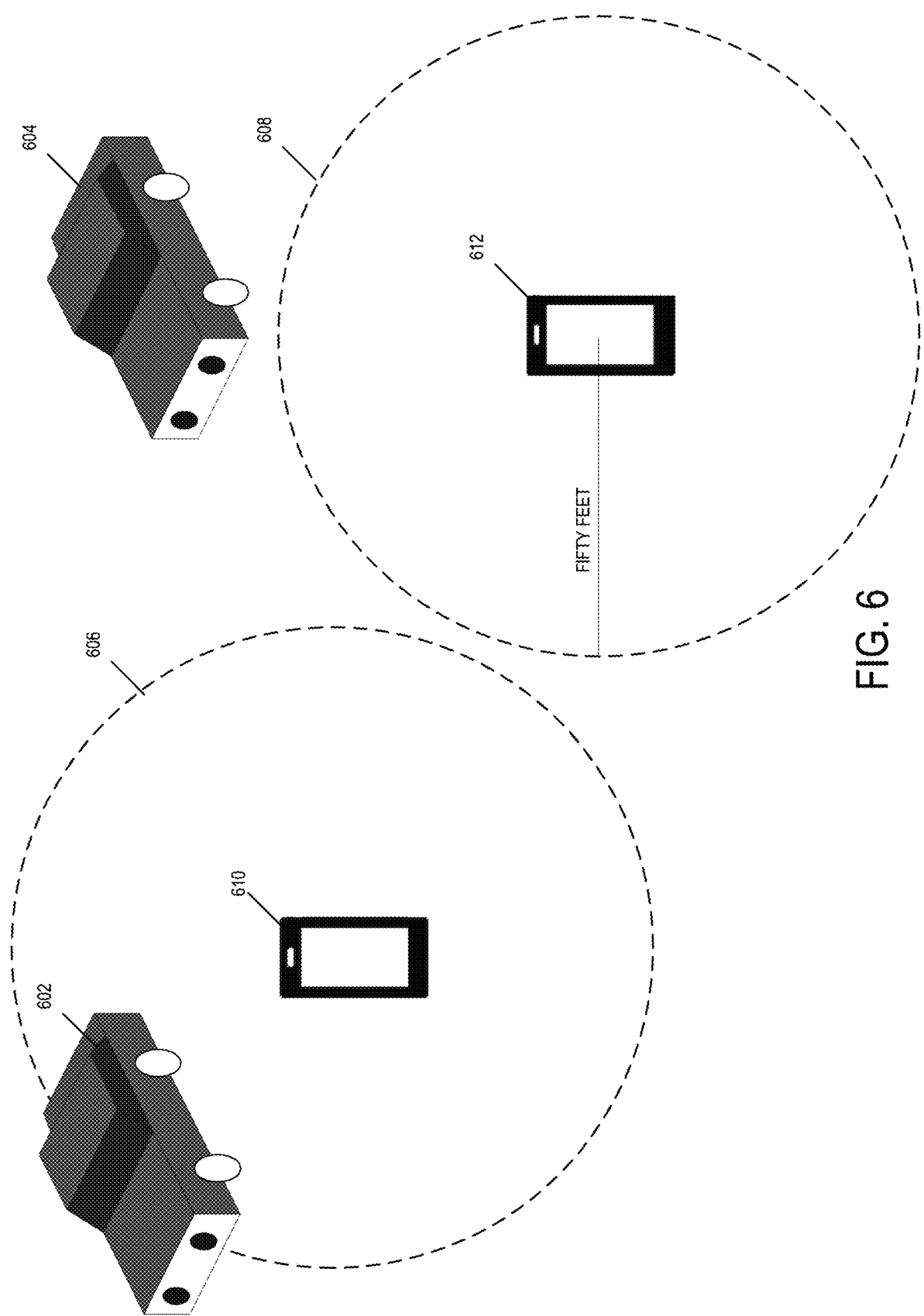
FIG. 6 illustrates an example of a geofence according to an example embodiment.

FIG. 6 illustrates an example of geofences used by the emergency notification application 108 according to an example embodiment. FIG. 6 shows a first vehicle 602 and a first geofence 606 that is shaped like a circle around a client computing device 610. As shown in FIG. 6, the client computing device 610 is in the center of the first geofence 606 and the geofence may extend a particular radius from the center of the circle, e.g., fifty feet. FIG. 6 also shows a second vehicle 604 and a second geofence 608 that is shaped like a circle around a client computing device 612. As shown in FIG. 6, the client computing device 612 is in the center of the second geofence 608 and the second geofence 608 may extend a particular radius from the center of the circle, e.g., fifty feet. Although the geofence is shown as a circle, it may be a square, rectangle, an irregular shape, or another shape.

Although the client computing device 610 is within the first geofence 606, the sensor device 102 may perform at least one of determine by a temperature sensor of the sensor device 102 that a temperature is greater than a first temperature and trigger the temperature notification, determine by the temperature sensor of the sensor device 102 that the temperature is less than a second temperature and trigger the temperature notification, determine by a sound sensor of the sensor device 102 that a decibel level is greater than a particular level and trigger the sound notification, and determine by a vibration sensor of the sensor device 102 that the vibration level is greater than a particular level, and trigger the vibration notification. In response to the notification from the sensor device 102, the sensor device 102 and/or the emergency notification application 108 may begin an emergency notification countdown timer having a particular period of time. The particular period of time may be five minutes or another period of time. The emergency notification application 108 may determine that the first vehicle 602 is within the first geofence 606 and may display a user interface that allows the user to deactivate the automatic notification system 100. The user may select a user interface element to deactivate the automatic notification system 100 and the emergency notification countdown timer may stop. However, if the user does not deactivate the automatic notification system 100 during the particular period of time, then the emergency notification application 108 may send at least one of a text message and an automated call to an emergency responder requesting assistance for the child in the seat of the vehicle 602.

As noted above, the second vehicle 604 is shown outside of the second geofence 608. The client computing device 612 may receive a notification from the sensor device 102 located in the vehicle 602. The notification may be one of a distance notification, a temperature notification, a sound notification, and a vibration notification. The sensor device 102 may determine at least one of the vehicle 604 is outside of the geofence 608 and trigger the distance notification, determine by a temperature sensor of the sensor device 102 that a temperature is greater than a first temperature and trigger the temperature notification, determine by the temperature sensor of the sensor device 102 that the temperature is less than a second temperature and trigger the temperature notification, determine by a sound sensor of the sensor device 102 that a decibel level is greater than a particular level and trigger the sound notification, and determine by a vibration sensor of the sensor device 102 that the vibration level is greater than a particular level and trigger the vibration notification. The emergency notification application 108 may determine that the vehicle 604 is outside of the geofence 608. The client computing device 104 may not display the user interface that allows the user to deactivate the automatic notification system 100. After the particular period of time, the emergency notification application 108 may send at least one of a text message and an automated call to an emergency responder requesting assistance for the child in the seat of the vehicle.

Figure 7:
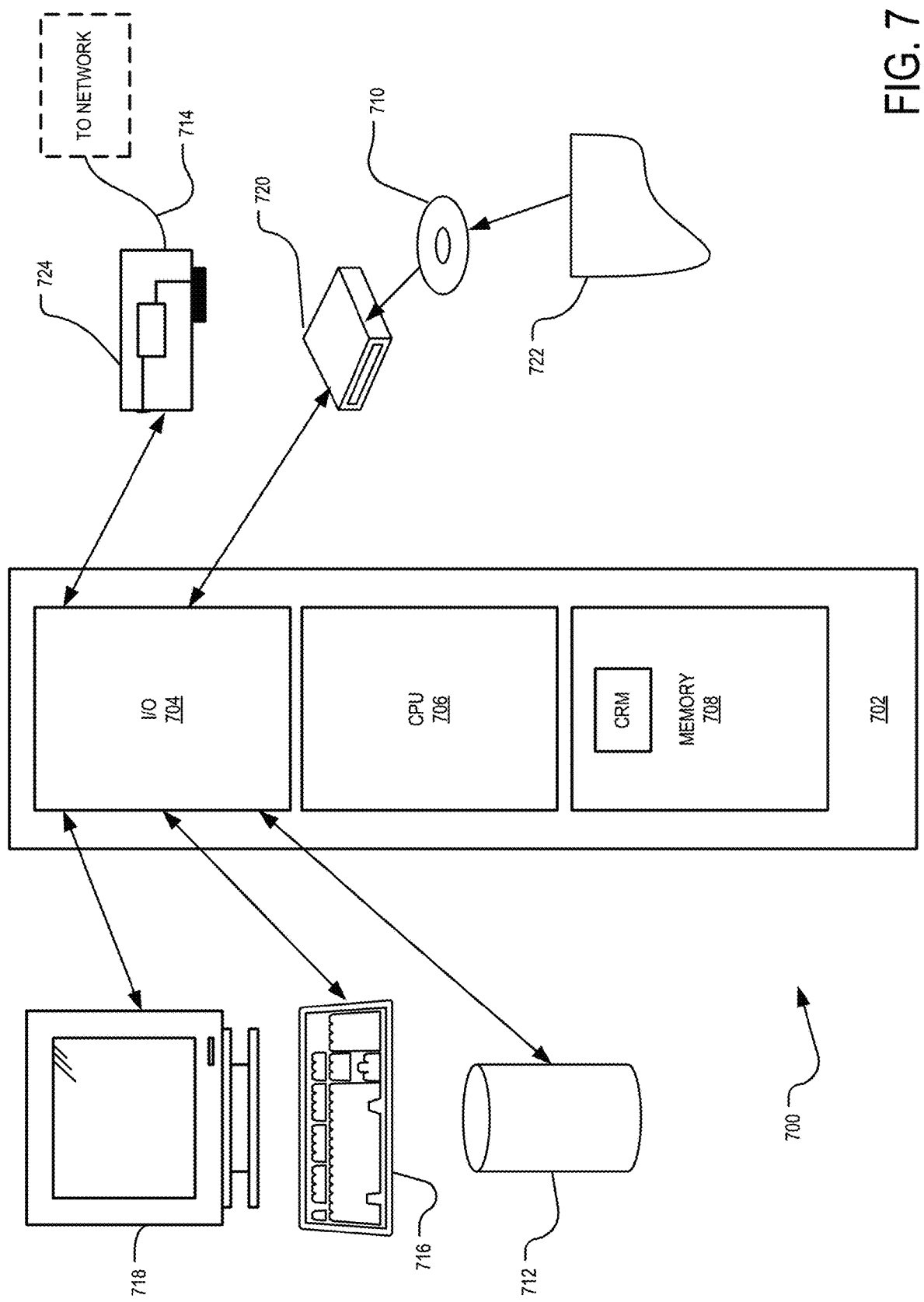
FIG. 7 illustrates a block diagram of a computing device according to an example embodiment.

FIG. 7 illustrates an example computing system 700 that may implement various systems, such as the sensor device 102 and the client computing device 104, and the methods discussed herein, such as process 300. A general purpose computer system 700 is capable of executing a computer program product to execute a computer process. Data and program files may be input to the computer system 700, which reads the files and executes the programs therein such as the emergency notification application 108. Some of the elements of a general purpose computer system 700 are shown in FIG. 7 wherein a processor 702 is shown having an input/output (I/O) section 704, a central processing unit (CPU) 706, and a memory section 708. There may be one or more processors 702, such that the processor 702 of the computer system 700 comprises a single central-processing unit 706, or a plurality of processing units, commonly referred to as a parallel processing environment. The computer system 700 may be a conventional computer, a server, a distributed computer, or any other type of computer, such as one or more external computers made available via a cloud computing architecture. The presently described technology is optionally implemented in software devices loaded in memory 708, stored on a configured DVD/CD-ROM 710 or storage unit 712, and/or communicated via a wired or wireless network link 714, thereby transforming the computer system 700 in FIG. 7 to a special purpose machine for implementing the described operations.

The memory section 708 may be volatile media, nonvolatile media, removable media, non-removable media, and/or other media or mediums that can be accessed by a general purpose or special purpose computing device. For example, the memory section 708 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 704 is connected to one or more user-interface devices (e.g., a keyboard 716 and a display unit 718), a disc storage unit 712, and a disc drive unit 720. Generally, the disc drive unit 720 is a DVD/CD-ROM drive unit capable of reading the DVD/CD-ROM medium 710, which typically contains programs and data 722. Computer program products containing mechanisms to effectuate the systems and methods in accordance with the presently described technology may reside in the memory section 708, on a disc storage unit 712, on the DVD/CD-ROM medium 710 of the computer system 700, or on external storage devices made available via a cloud computing architecture with such computer program products, including one or more database management products, web server products, application server products, and/or other additional software components. Alternatively, a disc drive unit 720 may be replaced or supplemented by another storage medium drive unit. The network adapter 724 is capable of connecting the computer system 700 to a network via the network link 714, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 700 is connected (by wired connection and/or wirelessly) to a local network through the network interface or adapter 724, which is one type of communications device. When used in a WAN-networking environment, the computer system 700 typically includes a modem, a network adapter, or any other type of communications device for establishing communications over the wide area network. In a networked environment, program modules depicted relative to the computer system 700 or portions thereof, may be stored in a remote memory storage device. It is appreciated that the network connections shown are examples of communications devices for and other means of establishing a communications link between the computers may be used.

In an example implementation, source code executed by the sensor device 102, the client computing device 104, a plurality of internal and external databases, source databases, and/or cached data on servers are stored in memory of the sensor device 102, memory of the client computing device 104, or other storage systems, such as the disk storage unit 712 or the DVD/CD-ROM medium 710, and/or other external storage devices made available and accessible via a network architecture. The source code executed by the sensor device 102 and the client computing device 104 may be embodied by instructions stored on such storage systems and executed by the processor 702.

Some or all of the operations described herein may be performed by the processor 702, which is hardware. Further, local computing systems, remote data sources and/or services, and other associated logic represent firmware, hardware, and/or software configured to control operations of the automatic notification system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 702 and a user may interact with a Graphical User Interface (GUI) using one or more user-interface devices (e.g., the keyboard 716, the display unit 718, and other user-interface devices in communication with the I/O section 704) with some of the data in use directly coming from online sources and data stores. The system set forth in FIG. 7 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
    a memory; and
    at least one processor to:
        receive a checkin notification in response to a user selecting a checkin user interface element displayed on a display;
        in response to the checkin notification, request a weight of a person in a seat of a vehicle from a weight sensor of a sensor device located in the vehicle and determine that the weight of the person is correct;
        receive a notification from the sensor device located in the vehicle, the notification comprising at least one of a distance notification, a temperature notification, a sound notification, and a vibration notification;
        in response to the notification from the sensor device, begin an emergency notification countdown timer having a particular period of time; and
        perform one of (1) determine that the vehicle is within a geofence, receive a checkout notification in response to the user selecting a checkout user interface element displayed on the display, and disable the emergency notification countdown timer, (2) determine that the vehicle is within the geofence, display the checkout user interface on the display, fail to receive the checkout notification, and after the particular period of time, send the at least one of a text message and an automated call to an emergency responder requesting assistance for the person in the seat of the vehicle, and (3) determine that the vehicle is outside of the geofence and after the particular period of time, send at least one of the text message and the automated call to the emergency responder requesting assistance for the person in the seat of the vehicle.

2. The system of claim 1, the at least one processor further to determine at least one of the vehicle is outside of the geofence and trigger the distance notification, determine by a temperature sensor of the sensor device that a temperature is greater than a first temperature and trigger the temperature notification, determine by the temperature sensor of the sensor device that the temperature is less than a second temperature and trigger the temperature notification, determine by a sound sensor of the sensor device that a decibel level is greater than a particular level and trigger the sound notification, and determine by a vibration sensor of the sensor device that a vibration level is greater than a particular level and trigger the vibration notification.

3. The system of claim 1, wherein the at least one of the text message and the automated call comprises information associated with a make/model of the vehicle, a color of the vehicle, a name of the child, an age of the child, and a location of the vehicle.

4. The system of claim 1, wherein the geofence comprises a circle having a radius of fifty feet.

5. The system of claim 1, wherein the particular period of time is five minutes.

6. The system of claim 1, wherein the emergency responder comprises at least one of police, fire, and emergency medical services.

7. The system of claim 1, the at least one processor further to send a message to a computing device of a person associated with the child in the seat.

8. A method comprising:
    receiving, by at least one processor, a checkin notification in response to a user selecting a checkin user interface element displayed on a display;
    in response to the checkin notification, requesting, by the at least one processor, a weight of a person in a seat of a vehicle from a weight sensor of a sensor device located in the vehicle and determining that the weight of the person is correct;
    receiving, by the at least one processor, a notification from the sensor device located in the vehicle, the notification comprising at least one of a distance notification, a temperature notification, a sound notification, and a vibration notification;
    in response to the notification from the sensor device, beginning, by the at least one processor, an emergency notification countdown timer having a particular period of time; and
    performing, by the at least one processor, one of (1) determining that the vehicle is within a geofence, receiving a checkout notification in response to the user selecting a checkout user interface element displayed on the display, and disabling the emergency notification countdown timer, (2) determining that the vehicle is within the geofence, displaying the checkout user interface on the display, failing to receive the checkout notification, and after the particular period of time, sending the at least one of a text message and an automated call to an emergency responder requesting assistance for the person in the seat of the vehicle, and (3) determining that the vehicle is outside of the geofence and after the particular period of time, sending at least one of the text message and the automated call to the emergency responder requesting assistance for the person in the seat of the vehicle.

9. The method of claim 8, further comprising determining at least one of the vehicle is outside of the geofence and triggering the distance notification, determining by a temperature sensor of the sensor device that a temperature is greater than a first temperature and triggering the temperature notification, determining by the temperature sensor of the sensor device that the temperature is less than a second temperature and triggering the temperature notification, determining by a sound sensor of the sensor device that a decibel level is greater than a particular level and triggering the sound notification, and determining by a vibration sensor of the sensor device that a vibration level is greater than a particular level and triggering the vibration notification.

10. The method of claim 8, wherein the at least one of the text message and the automated call comprises information associated with a make/model of the vehicle, a color of the vehicle, a name of the child, an age of the child, and a location of the vehicle.

11. The method of claim 8, wherein the geofence comprises a circle having a radius of fifty feet.

12. The method of claim 8, wherein the particular period of time is five minutes.

13. The method of claim 8, wherein the emergency responder comprises at least one of police, fire, and emergency medical services.

14. The method of claim 8, further comprising sending a message to a computing device of a person associated with the child in the seat.

15. A non-transitory computer-readable storage medium, having instructions stored thereon that, when executed by a computing device cause the computing device to perform operations, the operations comprising:

receiving a checkin notification in response to a user selecting a checkin user interface element displayed on a display;

in response to the checkin notification, requesting a weight of a person in a seat of a vehicle from a weight sensor of a sensor device located in the vehicle and determining that the weight of the person is correct;

receiving a notification from the sensor device located in the vehicle, the notification comprising at least one of a distance notification, a temperature notification, a sound notification, and a vibration notification;

in response to the notification from the sensor device, beginning an emergency notification countdown timer having a particular period of time; and performing one of (1) determining that the vehicle is within a geofence, receiving a checkout notification in response to the user selecting a checkout user interface element displayed on the display, and disabling the emergency notification countdown timer, (2) determining that the vehicle is within the geofence, displaying the checkout user interface on the display, failing to receive the checkout notification, and after the particular period of time, sending the at least one of a text message and an automated call to an emergency responder requesting assistance for the person in the seat of the vehicle, and (3) determining that the vehicle is outside of the geofence and after the particular period of time, sending at least one of the text message and the automated call to the emergency responder requesting assistance for the person in the seat of the vehicle.

16. The non-transitory computer-readable storage medium of claim 15, the operations further comprising determining at least one of the vehicle is outside of the geofence and triggering the distance notification, determining by a temperature sensor of the sensor device that a temperature is greater than a first temperature and triggering the temperature notification, determining by the temperature sensor of the sensor device that the temperature is less than a second temperature and triggering the temperature notification, determining by a sound sensor of the sensor device that a decibel level is greater than a particular level and triggering the sound notification, and determining by a vibration sensor of the sensor device that a vibration level is greater than a particular level and triggering the vibration notification.

17. The non-transitory computer-readable storage medium of claim 15, wherein the at least one of the text message and the automated call comprises information associated with a make/model of the vehicle, a color of the vehicle, a name of the child, an age of the child, and a location of the vehicle.

18. The non-transitory computer-readable storage medium of claim 15, wherein the geofence comprises a circle having a radius of fifty feet.

19. The non-transitory computer-readable storage medium of claim 15, wherein the particular period of time is five minutes.

20. The non-transitory computer-readable storage medium of claim 15, wherein the emergency responder comprises at least one of police, fire, and emergency medical services.

* * * * *